United States Patent
Bredeau et al.

(10) Patent No.: US 9,061,462 B2
(45) Date of Patent: Jun. 23, 2015

(54) STAMPING AND/OR DRILLING DEVICE COMPRISING A SUBSTRATE SUPPORT HEAD WITH CONTINUOUSLY CONTROLLED ORIENTATION

(75) Inventors: Stephane Bredeau, Saint-Egreve (FR); Jacky Bancillon, Saint-Egreve (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 177 days.

(21) Appl. No.: 13/876,188

(22) PCT Filed: Sep. 29, 2011

(86) PCT No.: PCT/EP2011/067016
§ 371 (c)(1),
(2), (4) Date: Mar. 27, 2013

(87) PCT Pub. No.: WO2012/041976
PCT Pub. Date: Apr. 5, 2012

(65) Prior Publication Data
US 2013/0307173 A1    Nov. 21, 2013

(30) Foreign Application Priority Data
Oct. 1, 2010  (FR) .................................... 10 57960

(51) Int. Cl.
*B29C 59/02* (2006.01)
*B21D 22/02* (2006.01)
*B30B 15/00* (2006.01)
(Continued)

(52) U.S. Cl.
CPC .............. *B29C 59/02* (2013.01); *Y10T 408/16* (2015.01); *Y10T 408/03* (2015.01); *B21D 22/02* (2013.01); *B30B 15/0094* (2013.01); *B30B 15/068* (2013.01); *B23B 47/26* (2013.01)

(58) Field of Classification Search
CPC ...... B29C 59/02; B23B 47/26; Y10T 408/03; Y10T 408/10; B30B 15/068; B30B 15/0094
USPC .............................................. 425/385; 100/35
See application file for complete search history.

(56) References Cited

U.S. PATENT DOCUMENTS 5,272,904 A * 12/1993 Krumholz ........................ 72/455
5,746,122 A    5/1998 Gietz et al.
(Continued)

FOREIGN PATENT DOCUMENTS

JP            4-301814         10/1992

OTHER PUBLICATIONS

International Search Report issued Nov. 4, 2011 in Application No. PCT/EP2011/067016.

*Primary Examiner* — Yogendra Gupta
*Assistant Examiner* — Emmanuel S Luk
(74) *Attorney, Agent, or Firm* — Oblon, McClelland, Maier & Neustadt, L.L.P.

(57) ABSTRACT

A device for stamping and/or drilling a substrate, including two dies supported by two support assemblies configured to be moved relative to each other in translation. The assembly includes: a base; an orientable head fixed to the die; a connection mechanism between the base and the head to adjust orientation of the head relative to the base; pressure sensors configured to continuously output information about pressure applied at different points of the die; and a mechanism controlling a connection, to continuously control the orientation of the head relative to the base, in response to information output by the sensors.

17 Claims, 5 Drawing Sheets

(51) Int. Cl.
   *B30B 15/06*   (2006.01)
   *B23B 47/26*   (2006.01)

(56) References Cited

U.S. PATENT DOCUMENTS

| | | | |
|---|---|---|---|
| 5,993,189 A * | 11/1999 | Mueller et al. | 425/405.1 |
| 6,165,391 A * | 12/2000 | Vedamuttu | 264/1.33 |
| 6,758,664 B1 * | 7/2004 | Curtiss et al. | 425/193 |
| 6,764,737 B2 * | 7/2004 | Arakawa et al. | 428/64.1 |
| 7,165,957 B2 * | 1/2007 | Montelius et al. | 425/149 |
| 7,645,411 B2 * | 1/2010 | Miyakoshi | 264/319 |
| 8,387,526 B2 * | 3/2013 | Shimao et al. | 100/269.06 |
| 2003/0091781 A1 * | 5/2003 | Arakawa et al. | 428/64.4 |
| 2005/0140034 A1 * | 6/2005 | Ishikawa | 264/1.33 |
| 2006/0193938 A1 | 8/2006 | Iimura et al. | |
| 2010/0089255 A1 * | 4/2010 | Shimao et al. | 100/35 |
| 2013/0040105 A1 | 2/2013 | Garandet et al. | |
| 2013/0078330 A1 * | 3/2013 | Shimao et al. | 425/385 |

* cited by examiner

STAMPING AND/OR DRILLING DEVICE COMPRISING A SUBSTRATE SUPPORT HEAD WITH CONTINUOUSLY CONTROLLED ORIENTATION

TECHNICAL FIELD

This invention relates to the field of substrate stamping and drilling, making use of two dies designed to be displaced relative to each other in translation, for example by means of a hydraulic or mechanical tension/compression machine such as a press.

In particular, the invention relates to stamping and drilling of thin flat substrates made of polymer, ceramic, metallic or other materials.

The parts obtained are used in many applications in industry, particularly as components of MEMs (Micro ElectroMechanical Systems), especially for biology, medicine or even chemistry.

STATE OF PRIOR ART

A stamping action may be considered as a technique for forming a pattern on a surface of a substrate. It is based on mechanical structuring of a viscous material by pressing the substrate between two dies, also called punches or moulds. This technique is particularly suitable for structuring of polymers, but is also very efficient for structuring of ceramic and metallic substrates.

Conventionally, the substrate is heated to a temperature equal to or greater than its vitreous transition temperature $T_g$, so that it is in a rubbery state. The press plates are then brought towards each other such that the substrate is pressed between the two dies, so that the material is forced to fill in the microcavities formed in either or each of these dies, under the action of the press. Once these cavities have been filled in by the material, the dies and the sample are cooled while maintaining constant pressure, in order to limit material shrinkage. When the temperature of the part obtained drops to less than the viscous transition temperature $T_g$, the part is separated from the dies, usually after a predetermined cooling time has elapsed.

Alternatively, stamping may be done cold, in other words at ambient temperature.

Many stamping devices are known according to prior art. Nevertheless, there is a permanent need to improve quality, uniformity and repeatability of patterns formed by stamping on either or each of the substrate faces. There is also a similar need in the related field of drilling a substrate.

SUMMARY OF THE INVENTION

Therefore, the purpose of the invention is to at least partially overcome the disadvantages mentioned above related to embodiments according to prior art.

To achieve this, the first objective of the invention is a device for stamping and/or drilling a substrate comprising two stamping/drilling dies each supported by a support assembly, the support assembly being designed to be displaced relative to each other in translation such that said dies apply pressure to said substrate when it is placed between these dies.

According to the invention, at least one of said support assemblies comprises a base, an orientable head fixed to the die associated with this assembly, and connection means between the base and the head to adjust the orientation of this head relative to the base.

Furthermore, the device also comprises a plurality of pressure sensors designed to continuously output information about the pressure applied at different points on one of said dies, when the substrate is squeezed by said two dies.

Finally, the device also comprises means of controlling said connection means designed to continuously control the orientation of the head relative to the base, in response to information output by said plurality of pressure sensors.

Therefore, the invention is remarkable in that it can be used to easily and reliably know the pressure distribution applied on one of the two dies by means of the plurality of sensors, providing direct information about the pressure distribution applied on the substrate in contact with this die. The orientation of the head is then advantageously continuously controlled in response to pressure information output by the sensors, so that this distribution is as close as possible to the desired distribution, which is preferably a uniform pressure distribution on the die and substrate, usually obtained by maintaining precise and constant parallelism between the two dies applying the pressure.

Thus, this continuous control of the die orientation results in continuous control of the pressure distribution on the substrate, which significantly improves quality, uniformity and repeatability of the patterns formed and/or drilled on one and/or the other of the faces of the substrate. Even if preferably only one of the two dies is provided with patterns to be formed on the substrate, the other die in contact with the opposite surface of the substrate could also be provided with such patterns, without going outside the framework of the invention.

Preferably, only one of the two support assemblies is fitted with an orientable head. Alternatively, each of the two assemblies could be fitted with such a controlled orientable head.

Furthermore, note that the die associated with the pressure sensors is preferably the die mounted on the support assembly fitted with the orientable head. However, the opposite solution could be possible without going outside the framework of the invention. Furthermore, each of the two dies could be associated with a plurality of sensors specific to it, regardless of whether or not it can be controlled in orientation.

The invention is preferably applicable to substrates between 50 μm and 10 mm thick. The geometry of the patterns to be formed may be varied, for example strips or spheres. These patterns are then generally uniformly distributed along rows and columns.

Preferably, said connection means include a device forming a ball joint connection and at least two support systems adjustable in height. This configuration is simple in design, because it makes it possible to actuate one or both of the two support systems to move the head around the ball joint, and thus modify its inclination.

Preferably, said orientable head is fitted with a counterweight arranged such that when viewed along the direction of relative translation of the two support assemblies, the centre of gravity of said part of said support assembly supported by said base is located inside a triangle for which the vertices are at the centre of the connection forming the ball joint and the contact points of the two support systems on said base. This means that this part of the support assembly can be reliably stabilised on the base.

Preferably, said triangle is a right angle isosceles triangle with the right angle at the vertex at the centre of the connection forming the ball joint. This shape, that affects positioning of the two support systems, enables fine adjustment of the orientation of the orientable head.

Preferably, each height adjustable support system is a micrometer screw, widely commercially available and well known as being reliable and precise.

Preferably, at least one of said support assemblies comprises a primary body on which its associated die is fitted, for example by screwing.

Preferably, said pressure sensors are inserted between said die and said primary body.

Preferably, the primary body is provided with housings fitted with heating cartridges and cooling fluid circulation ducts. This configuration enables very high heating and cooling rates.

For even higher efficiency, it is arranged that said housings are orthogonal to said ducts, and/or said ducts are arranged between said housings and said die of the support assembly.

Said support assembly also comprises a secondary body made of stainless steel separate from the primary body made of brass by a thermally insulating part, to provide a satisfactory thermal inertia.

Finally, preferably, at least one of the dies is coated with a carbon layer in the form of amorphous diamond (called DLC layer). This increases the life of the dies, and facilitates removal of the part obtained after the substrate has been stamped due to the low coefficient of friction of said layer.

Another purpose of the invention is an installation enabling stamping and/or drilling of a substrate comprising a device like that described above, mounted on a tension/compression machine such as a press, enabling said two support assemblies to be moved relative to each other in translation.

Finally, the purpose of the invention is a substrate stamping and/or drilling method using a device like that described above, the method using continuous control of the orientation of the head relative to the base, in response to information output by said plurality of pressure sensors.

Other advantages and characteristics of the invention will become clear after reading the detailed non-limitative description given below.

BRIEF DESCRIPTION OF THE DRAWINGS

This description will be made with reference to the appended drawings among which.

DETAILED DESCRIPTION OF PARTICULAR EMBODIMENTS

Figure 1:
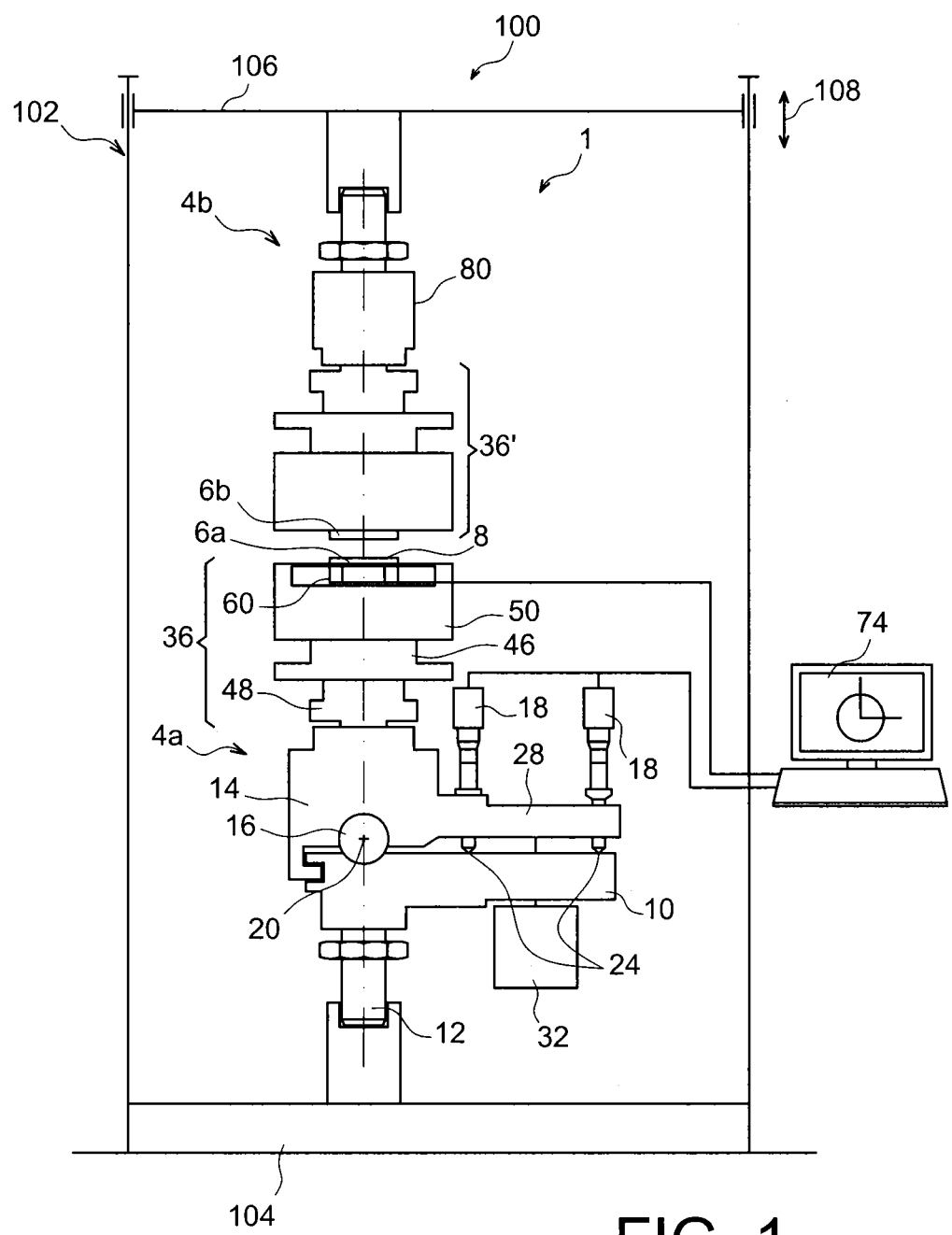
FIG. 1 shows a diagrammatic front view of an installation comprising a press and a device for stamping and/or drilling a substrate according to one preferred embodiment of this invention.

Firstly with reference to FIG. 1, the figure shows an installation 100 comprising a hydraulic or mechanical press 102 and a device 1 for stamping a substrate according to one preferred embodiment of this invention.

The conventionally designed press 102 known to those skilled in the art globally comprises a frame 104 and a carriage 106 mounted free to translate on the frame, along a pressurisation direction 108. The press 102 holds the device 1 that comprises two support assemblies 4a, 4b that will be moved relative to each other along a direction of translation corresponding to direction 108.

The support assembly 4a, called the lower assembly, is mounted removably on the base of the frame 104, while the support assembly 4b called the upper assembly, is mounted removably on the carriage 106, above the assembly 4a and in line with it along the direction 108.

At its top end, the support assembly 4a supports a lower die 6a, and similarly support assembly 4b supports an upper die 6b at its bottom end facing the die 6a on which the substrate 8 to be stamped is placed. In the example described, only the lower die 6a is provided with relief that will be used to form patterns on the lower surface of the substrate, its upper surface then being intended to remain plane without any patterns. Alternatively, the upper die 6b or both of the dies could be structured with relief. The following descriptions related to the die structured in relief 6a could thus be applied to the die 6b.

The lower support assembly 4a comprises firstly a base 10 removably connected to the frame 104 through a connecting shaft 12. The base 10 is fitted with an orientable head 14, connection means being inserted between these two elements. These connection means that are used to adjust the orientation of the head 14 relative to the base 10 as will be described in more detail below, comprise a connection 16 forming a ball joint and two micrometer screws 18, 18 adjustable in height along the direction 108. Each of these screws 18 may for example have a fixed body mounted on the head 14, and a tip that can be extended along the direction 108, supported by the fixed body and in point bearing at its opposite end in contact with the upper surface of the base 10.

Figure 2:
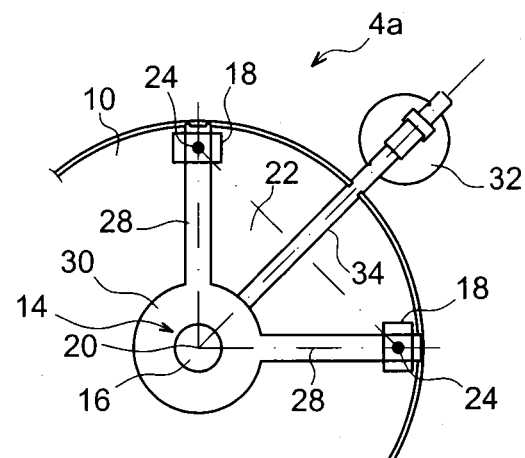
FIG. 2 shows a diagrammatic top view of the orientable head of the device in FIG. 1.

With reference to FIG. 2, it can be seen that the two screws 18 are arranged at 90° from each other measured from the centre 20 of the ball joint connection 16. In other words, looking along the direction of translation 108 as shown in FIG. 2, an isosceles right-angled triangle 22 is formed with one vertex at the centre 20 of the connection forming the ball joint, and each of the other two vertices at one of the two contact points 24 of the two screws 18 on the upper surface of the base 10.

To achieve this, the screws 18 may be placed at the free ends of the arms 28 carried by a circular-shaped head core 30 on which the ball joint connection 16 is arranged.

Furthermore, the orientable head 14 is fitted with a counterweight 32 arranged such that when looking along the direction of translation 108, the centre of gravity of the part of the support assembly 4a carried by the base 10 is located inside the triangle 22. This part of the assembly 4a consists of all elements of the assembly located above the base 10, in other words all elements located between the orientable head 14 and the lower die 6a.

Once again, the counterweight may be suspended at the free end of an arm 34 supported by the head core 30 and located between the other two arms 28.

This arrangement increases the stability of the lower assembly 4a because the particular position of the centre of gravity inside the triangle 22 assures that the screws 18 are always in contact with the upper surface of the base 10 of this assembly.

The orientable head 14 comprises a plurality of elements of the lower support assembly 4a, including the die 6a. These elements, marked with the global numeric reference 36 in FIG. 1, will now be described in detail with reference to FIG. 3.

In this figure, the lower die 6a will support the substrate 8. This die is mounted removably but is fixed in position for example by screwing/bolting, on a brass primary body 40. The primary body 40 has an indent 42 for this purpose on its upper part, inside which the base of the complementary shaped die is fitted. The generally disk shaped body 40 is connected on a thermally insulating part 44, for example made of stumatite. This part 44 is inserted between the primary body 40 and a secondary body 46 made of stainless steel, that carries a connecting device 48 at the orientable head 14. Furthermore, a stainless steel cap 50 covers part of these elements, particularly the insulating part 44 and the primary support body 40 as can be seen in FIG. 3.

The head 14 and the above mentioned elements 48, 46, 44, 40 and 6a are fixed to each other after assembly.

Figure 3:
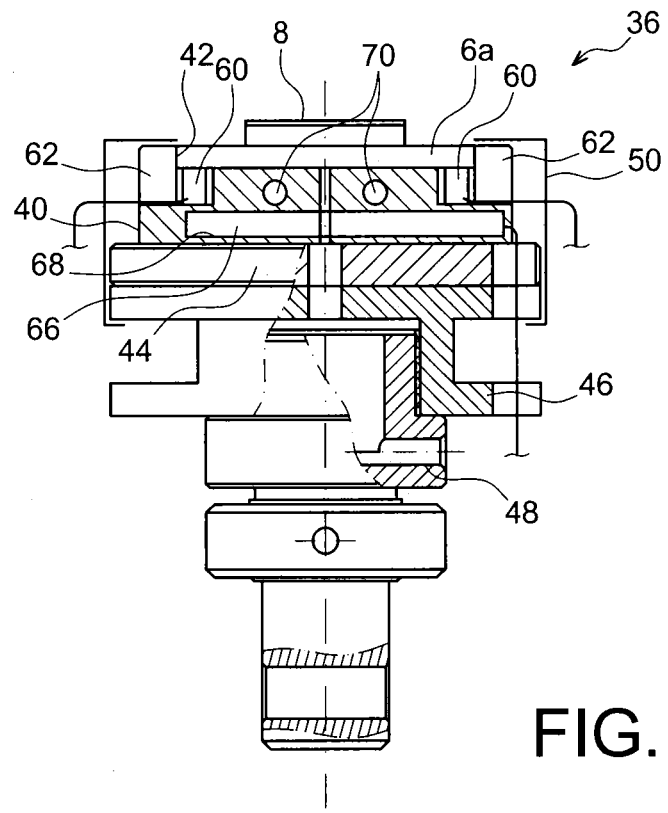
FIG. 3 shows a front view of a portion of a die support assembly fitted on the device shown in the previous figures.
Figure 4:
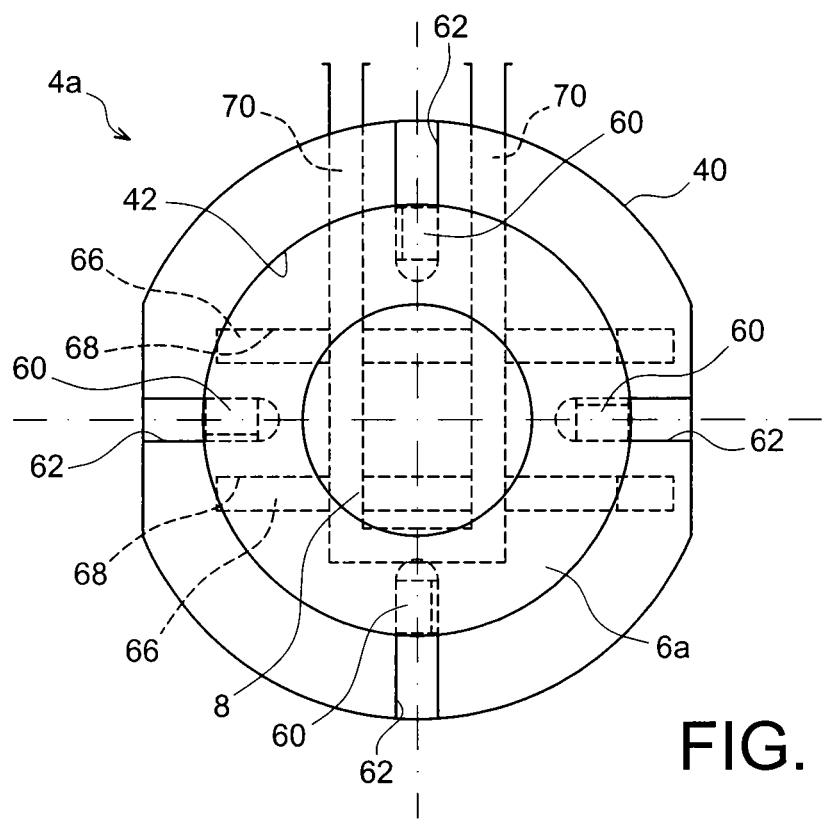
FIG. 4 shows a top view of the portion of a die support shown in FIG. 3.

With reference jointly to FIGS. 3 and 4, it can be seen that the support assembly 4a comprises a plurality of pressure sensors 60, in this case four sensors distributed at 90° from a centre of the die 6a housed in the indent 42.

The conventionally designed sensors 60 known to those skilled in the art are housed in recesses 62 formed on the primary body 40, these recesses opening up radially to the outside and opening radially to the inside in the indent 42. Thus, each pressure sensor 60 is inserted along direction 108 between a flat on the primary body 40 defining the bottom of a recess 62, and the lower surface of the die 6a, preferably at a periphery of the die.

For the cases in which stamping must be done hot, namely when the substrate has to be heated to a temperature greater than or equal to its vitreous transition temperature $T_g$, the primary body 40 is preferably equipped with heating means and cooling means.

For the heating means, it is planned to provide several heating cartridges 66 installed free to move in the housings 68 formed within the primary body 40. Their number is adapted as a function of needs encountered. For example, there may be two of them, arranged parallel to each other and orthogonal to the direction 108, in the bottom of the body 40.

The power output by these cartridges inserted in the body 40 may be controlled by computer, through a temperature regulator and thermocouples (not shown). For example, the cartridges have a diameter of about 6.3 mm, and the power of each is about 80 W.

The cooling means may be made in the form of cooling fluid circulation ducts 70, also formed within the primary body 40, preferably as close as possible to the die 6a, between the die and the cartridges 66. Once again, their number and shape are adaptable as a function of needs encountered. For example, there may be two, parallel to each other and orthogonal to the direction 108 and to the cartridges 66. A connector connects their end so that a circulation of cooling fluid entering through one of the ducts and exiting through the other of these ducts can be set up.

In particular, this configuration enables very high heating and cooling rates. For example, the heating rate may be of the order of +7° C./mn over the interval between 120 and 140° C., and the cooling rate may be of the order of −75° C./mn over the same interval.

Returning to FIG. 1, the figure shows that pressure sensors 60 of the device 1 are connected to control means 74, for example such as a computer. Therefore, these control means are designed to continuously receive information from sensors 60 about the pressure applied on the lower die 6a at different points on the die corresponding to contact points between the lower surface of this die and the different sensors.

The control means 74 are designed to continuously control orientation of the head 14 relative to the base 10 based on received information, appropriately controlling the two micrometer screws 18.

It is also noted that the upper support assembly 4b has a group of elements 36' that is identical or similar to the group of elements 36 in FIG. 3, the pressure sensors and the heating and cooling means remaining optional in this case. This group 36', in position opposite to the position of group 36 to orient the die 6b in the downwards direction, is mounted removably on the carriage 106 through connection means 80.

Figure 5:
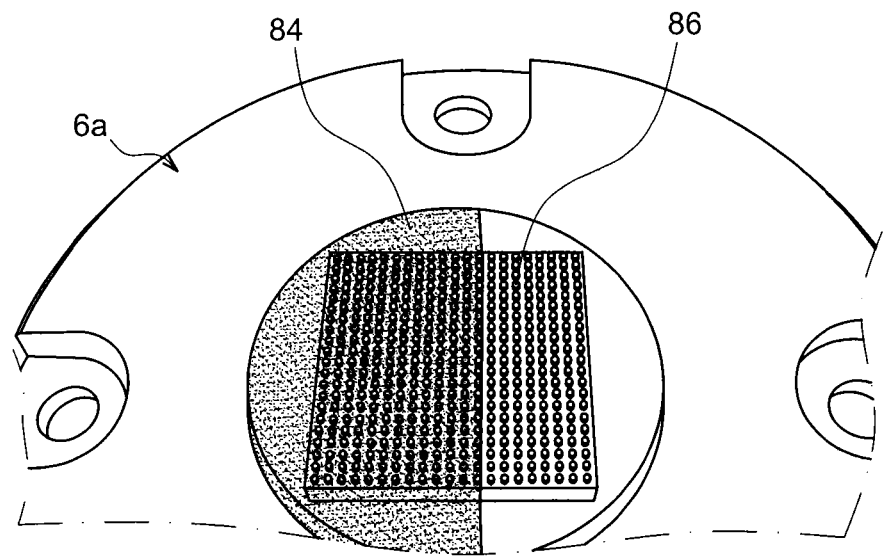
FIG. 5 shows one of the dies of the device shown in the previous figures.

Finally, note that one and/or both of the two dies may be coated with a carbon coating 84 in the form of amorphous diamond, shown partly in FIG. 5 showing the lower die 6a provided with relief 86. This type of layer, also called film, improves the life of the die and facilitates removal of the part after the stamping phase due to the low coefficient of friction that it provides. This layer is preferably deposited using a "PECVD" (Plasma Enhanced Chemical Vapour Deposition) type method. This technique can give a single so-called DLC (Diamond Like Carbon) layer, with a typical thickness of between 10 and 2000 nm. In this case, the thickness of the deposited layer 84 is preferably of the order of 1.8 μm.

Furthermore, in order to improve adhesion between the surface of the die preferably made of brass and the film 84, a thin layer of silicon carbide SiC may firstly be deposited, for example with a thickness of the order of 400 nm. Note that this layer 84 is also applicable on dies made from materials other than brass, for example stainless steel.

Figure 6A:
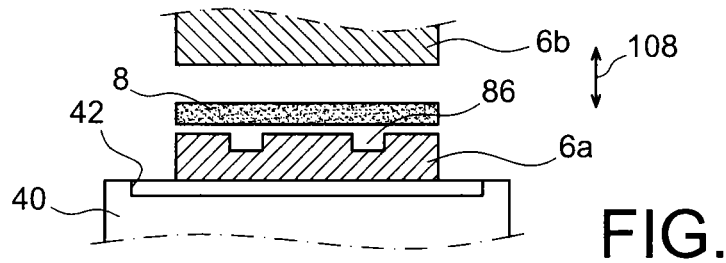
FIGS. 6a to 6c show the different successive steps in a stamping method used with the device shown in the previous figures.
Figure 6B:
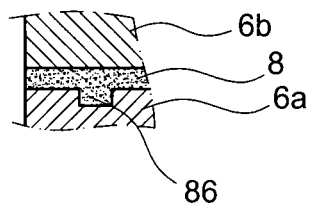
Figure 6C:
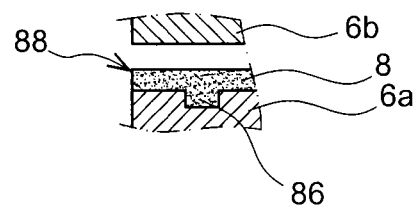

With reference to FIGS. 6a to 6c, we will now describe the different successive steps in a stamping method used with the device 1 shown in the previous figures.

Firstly, the substrate 8 is placed on the lower die 6a, which is then heated using cartridges at a stamping temperature greater than or equal to the vitreous transition temperature $T_g$ of the substrate 8. At this instant diagrammatically shown in FIG. 6a in which the upper die 6b is still at a distance from the substrate, the pressure information collected by the control means 74 can already detect a balancing fault of the different pressures applied on the die 6a. If this is the case, then the micrometer screws 18 are controlled by these means 74 to correct the orientation of the head 14, this correction resulting in an almost identical correction to the orientation of the lower die 6a and the substrate 8 bearing on it.

The stamping phase is then performed by applying pressure to the substrate 8 between the two dies 6a, 6b, by downwards displacement of the upper die 6b along the direction 108.

Compression plastically deforms the substrate 8 so as to fill in the micro-cavities of the lower die 6a shown diagrammatically in FIG. 6b. The orientation of the head 14 around the ball joint 16 is controlled by means 74 throughout this pressurisation phase performed by controlled displacement of the carriage 106 on the frame 104 of the press.

This orientation of the head continuously controlled in response to pressure information output by the sensors, is such that the pressure distribution on the die 6a is as close as possible to that desired, which is preferably a uniform pressure distribution on the four controlled points of this die. Thus, control of the orientation of the die 6a by controlling the orientation of the head 14, actually maintains precise and constant parallelism between the two dies 6a, 6b throughout the stamping phase. Continuous control over the pressure distribution on the substrate 8 squeezed between the two dies is achieved as a result of this continuous control of the orientation of the die 6a, which can significantly improve the quality, uniformity and repeatability of patterns formed on the lower surface of the substrate.

Figure 7:
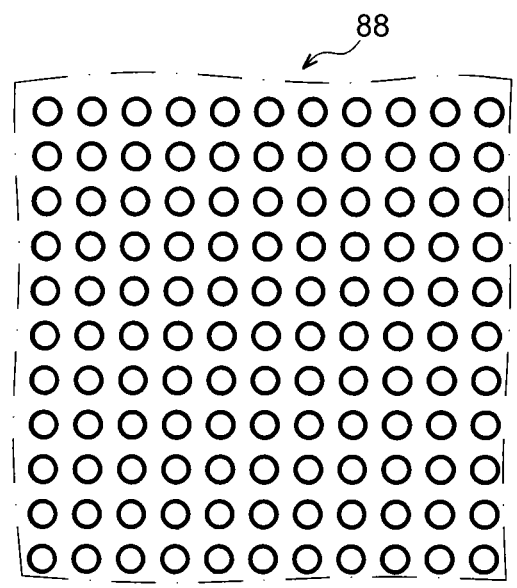
FIG. 7 shows an example of a part obtained following implementation of the method shown diagrammatically in FIGS. 6a to 6c.

The heating means are then deactivated, and the cooling means are then activated in turn by circulating the fluid inside the ducts 70, while maintaining the pressure on the substrate between the two dies. When the temperature of the part obtained drops below the vitreous transition temperature $T_g$, the part is separated from the dies after a predetermined cooling time has elapsed. This is done by raising the upper die 6b along the direction 108 as shown diagrammatically in FIG. 6c, and the part obtained 88, an example of which is shown in FIG. 7, can then be easily removed from the lower die 6a.

Figure 8:
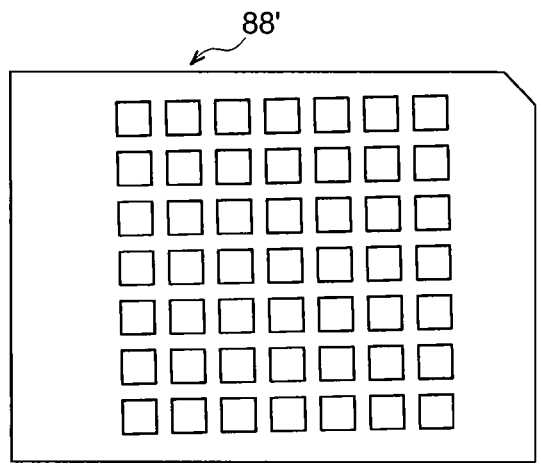
FIG. 8 shows an example part obtained following the use of a similar method, in which the substrate is drilled.

The part 88' shown in FIG. 8 is an example of a drilled part obtained following use of a method similar to that described above, but with dies for drilling the substrate.

Figure 9:
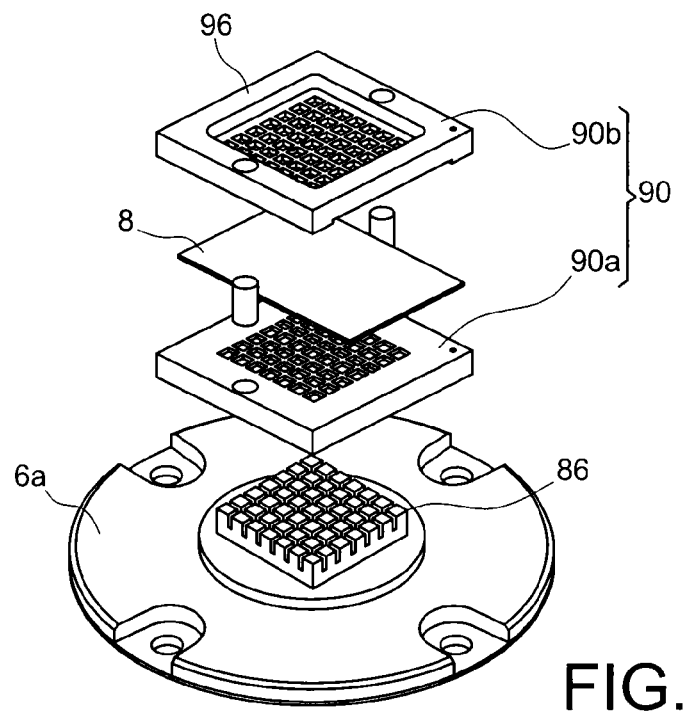
FIG. 9 shows an exploded perspective view of a part of the tooling used to obtain the part shown in the previous figure.
Figure 10:
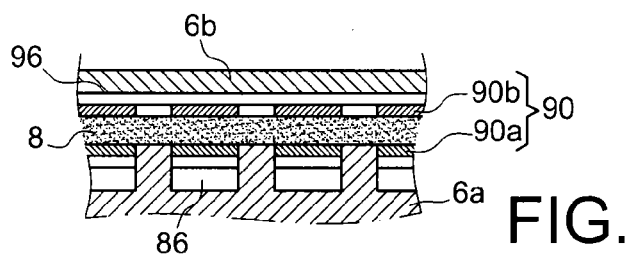
FIG. 10 shows a sectional view of the part shown in the previous figure.

As shown in FIGS. 9 and 10, this is done by providing the lower die 6a with relief 86 that in this case will pass through the substrate 8 entirely. The substrate is located between two parts 90a, 90b of a grid 90, the holes of which correspond to the relief 86 in order so that the holes can pass through. At the time that the drilling phase begins, the relief 86 fits in the holes in the lower part 90a of the grid 90, while the upper plane die 6b bears on a raised upper edge 96 of the upper part 90b of the grid.

For example, the method may be used for cold stamping or embossing of an alumina substrate. The shape of this substrate may be square with 30 mm sides and with a thickness of the order of 400 µm. The force applied by the upper die may be of the order of 3 kN for a period of about 60 s. The depth of the patterns formed is of the order of 150 µm.

Another example is stamping a polyglycolide (PGA) substrate. The shape of this substrate may be square with 40 mm sides, and with a thickness of the order of 1.4 mm. The stamping temperature is of the order of 60° C. and the force applied by the upper die may be of the order of 1.1 kN, for a duration of about 10 s. The cooling temperature may be fixed at 16° C. for a cooling time of the order of 50 s. The patterns formed are of the order of 100 µm deep.

Finally, it may be cold drilling of a zirconium substrate. The shape of this substrate may be rectangular with 35 and 22 mm side dimensions, and its thickness may be of the order of 400 µm. The force applied by the upper die may be of the order of 0.6 or 0.7 kN, for about 5 s.

Obviously, those skilled in the art could make various modifications to the invention described herein solely as a non-limitative example.

The invention claimed is:

1. A device for stamping and/or drilling a substrate, comprising:
 two stamping/drilling dies each supported by a support assemblies, configured to be moved relative to each other in translation so that the dies apply pressure to the substrate when the substrate is placed between the dies;
 wherein at least one of the support assemblies comprises a base, an orientable head fixed to the die associated with this assembly, and connection means between the base and the head to adjust orientation of the head relative to the base; and
 further comprising:
 a plurality of pressure sensors, configured to continuously output information about pressure applied at different points on one of the two dies, when the dies apply pressure to the substrate; and
 means for controlling the connection means configured to continuously control the orientation of the head relative to the base, in response to information output by the plurality of pressure sensors,
 wherein the connection means includes a device forming a ball joint connection and at least two support systems adjustable in height, and
 wherein the orientable head is fitted with a counterweight arranged such that when viewed along a direction of relative translation of the two support assemblies, a center of gravity of the part of the support assembly supported by the base is located inside a triangle for which vertices are at a center of the connection forming the ball joint, and contact points of the two support systems on the base.

2. The device according to claim 1, wherein the triangle is a right angle isosceles triangle with the right angle at a vertex at a center of the connection forming the ball joint.

3. A device for stamping and/or drilling a substrate, comprising:
 two stamping/drilling dies each supported by a support assemblies, configured to be moved relative to each other in translation so that the dies apply pressure to the substrate when the substrate is placed between the dies;
 wherein at least one of the support assemblies comprises a base, an orientable head fixed to the die associated with this assembly, and connection means between the base and the head to adjust orientation of the head relative to the base; and
 further comprising:
 a plurality of pressure sensors, configured to continuously output information about pressure applied at different points on one of the two dies, when the dies apply pressure to the substrate; and
 means for controlling the connection means configured to continuously control the orientation of the head relative to the base, in response to information output by the plurality of pressure sensors,
 wherein the connection means includes a device forming a ball joint connection between the base and the head, and
 wherein the connection means includes at least two support systems adjustable in height, the two support systems being located on a same side of the head such that the two support systems form a triangle with vertices at a center of the ball joint connection and contact points of the two support systems on the base.

4. The device according to claim 3, wherein each height adjustable support system is a micrometer screw.

5. The device according to claim 3, wherein at least one of the support assemblies comprises a primary body on which an associated die is fitted.

6. The device according to claim 5, wherein the pressure sensors are inserted between the die and the primary body.

7. The device according to claim 5, wherein the primary body includes housings fitted with heating cartridges, and cooling fluid circulation ducts.

8. The device according to claim 7, wherein the housings are orthogonal to the ducts.

9. The device according to claim 7, wherein the ducts are arranged between the housings and the die of the support assembly.

10. The device according to claim 5, wherein the support assembly further comprises a secondary body made of stainless steel separate from the primary body made of brass by a thermally insulating part.

11. The device according to claim 3, wherein at least one of the dies is coated with a carbon layer in a form of amorphous diamond.

12. An installation enabling stamping and/or drilling of a substrate, comprising:
   the device according to claim 3, mounted on a tension/compression machine enabling the two support assemblies to be moved relative to each other in translation.

13. A substrate stamping and/or drilling method using the device according to claim 3, comprising:
   using continuous control of the orientation of the head relative to the base, in response to information output by the plurality of pressure sensors.

14. The device according to claim 3, wherein the triangle is a right angle isosceles triangle with the right angle at a vertex at a center of the ball joint connection.

15. The device according to claim 3, wherein the means for controlling includes a computer.

16. The device according to claim 1, wherein each of the two support systems is a micrometer screw.

17. The device according to claim 1, wherein the means for controlling includes a computer.

\* \* \* \* \*